United States Patent [19]
Brown

[11] Patent Number: 5,887,756
[45] Date of Patent: Mar. 30, 1999

[54] DISPENSING GUN WITH VALVING ROD AND BELLOWS-TYPE SEAL

[75] Inventor: Daniel P. Brown, Palos Park, Ill.

[73] Assignee: Insta-Foam Products, Inc., Joliet, Ill.

[21] Appl. No.: 828,667

[22] Filed: Mar. 31, 1997

Related U.S. Application Data

[63] Continuation-in-part of Ser. No. 264,641, Jun. 23, 1994, Pat. No. 5,615,804.

[51] Int. Cl.$^6$ ........................................................ B67D 5/52
[52] U.S. Cl. .................. 222/136; 222/145.5; 222/145.7; 222/287; 222/394; 222/518
[58] Field of Search ..................................... 222/135, 136, 222/137, 145.1, 145.5, 145.7, 287, 394, 509, 510, 518

[56] References Cited

U.S. PATENT DOCUMENTS

| | | | |
|---|---|---|---|
| 393,536 | 11/1888 | Brudin | 251/335.2 X |
| 2,506,837 | 5/1950 | Kochner | 251/335.2 X |
| 2,612,403 | 9/1952 | Burch | 239/375 X |
| 3,000,576 | 9/1961 | Levey et al. | 239/499 |
| 3,172,605 | 3/1965 | Brooks | 239/583 |
| 3,904,174 | 9/1975 | Giese | 251/331 |
| 4,166,606 | 9/1979 | Kawolics et al. | 251/214 |
| 4,176,686 | 12/1979 | Stahle | 137/604 |
| 4,180,239 | 12/1979 | Valukis | 251/60 |
| 4,720,076 | 1/1988 | Hyde | 251/122 |
| 4,911,401 | 3/1990 | Holcomb et al. | 251/30.03 |
| 5,094,402 | 3/1992 | Perret, Jr. et al. | 239/526 |
| 5,097,993 | 3/1992 | Davis | 222/509 |
| 5,104,090 | 4/1992 | Grizzle et al. | 251/61.1 |
| 5,160,117 | 11/1992 | Besombes | 251/144 |
| 5,180,082 | 1/1993 | Cherfane | 222/145 |
| 5,242,115 | 9/1993 | Brown | 239/414 |
| 5,244,117 | 9/1993 | Lombardo | 222/1 |
| 5,246,204 | 9/1993 | Ottung | 251/331 |
| 5,271,537 | 12/1993 | Johnson | 222/509 |
| 5,277,344 | 1/1994 | Jenkins | 222/504 |
| 5,477,988 | 12/1995 | Gerich | 222/209 |
| 5,573,146 | 11/1996 | Gardner | 222/509 |
| 5,615,804 | 4/1997 | Brown | 222/136 |
| 5,683,544 | 11/1997 | Kopp | 222/518 |

FOREIGN PATENT DOCUMENTS 3802519  8/1989  Germany .

Primary Examiner—Joseph A. Kaufman
Attorney, Agent, or Firm—Vedder Price Kaufman & Kammholz

[57] ABSTRACT

A dispensing gun for fluent products such as viscous adhesives and sealants. The gun includes a removably mounted nozzle and fittings for attachment to a product source such as a can or a hose. A valve body has product inlet and outlet passages with flow being controlled therethrough by a valve that includes a nose portion seated in the valve body, and a rod that extends through the nose portion of the valve and seats on tapered surfaces inside the end of the nozzle. The valve contains a shrouded internal spring biasing the valve to a closed position. A trigger engages the yoke carrying the valve and the valving rod and moves the yoke so that the rod and valve move between open, closed and intermediate positions. In one preferred form, the valving rod may be adjusted between positions wherein more or less product is dispensed in response to full trigger movement.

14 Claims, 9 Drawing Sheets

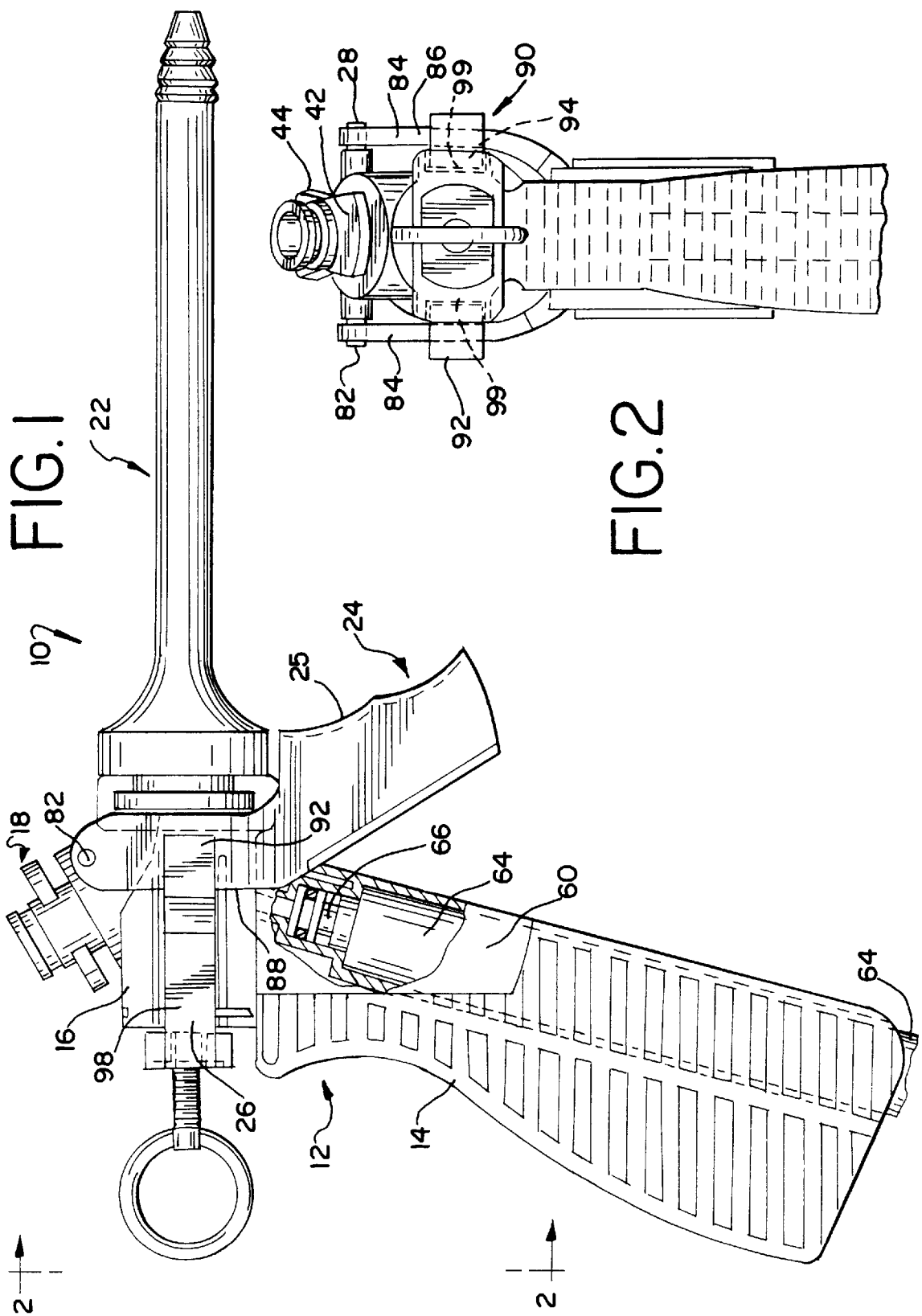

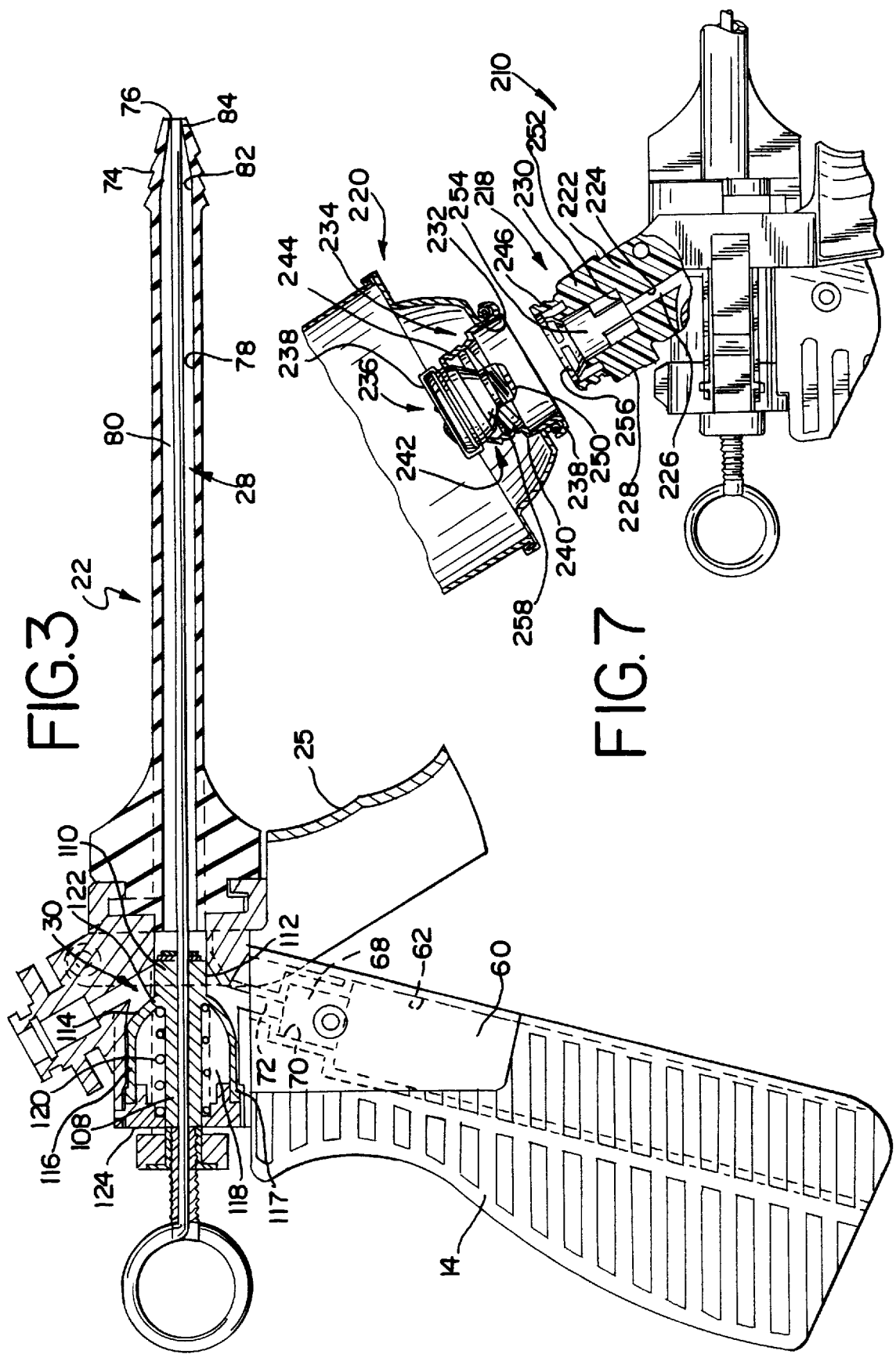

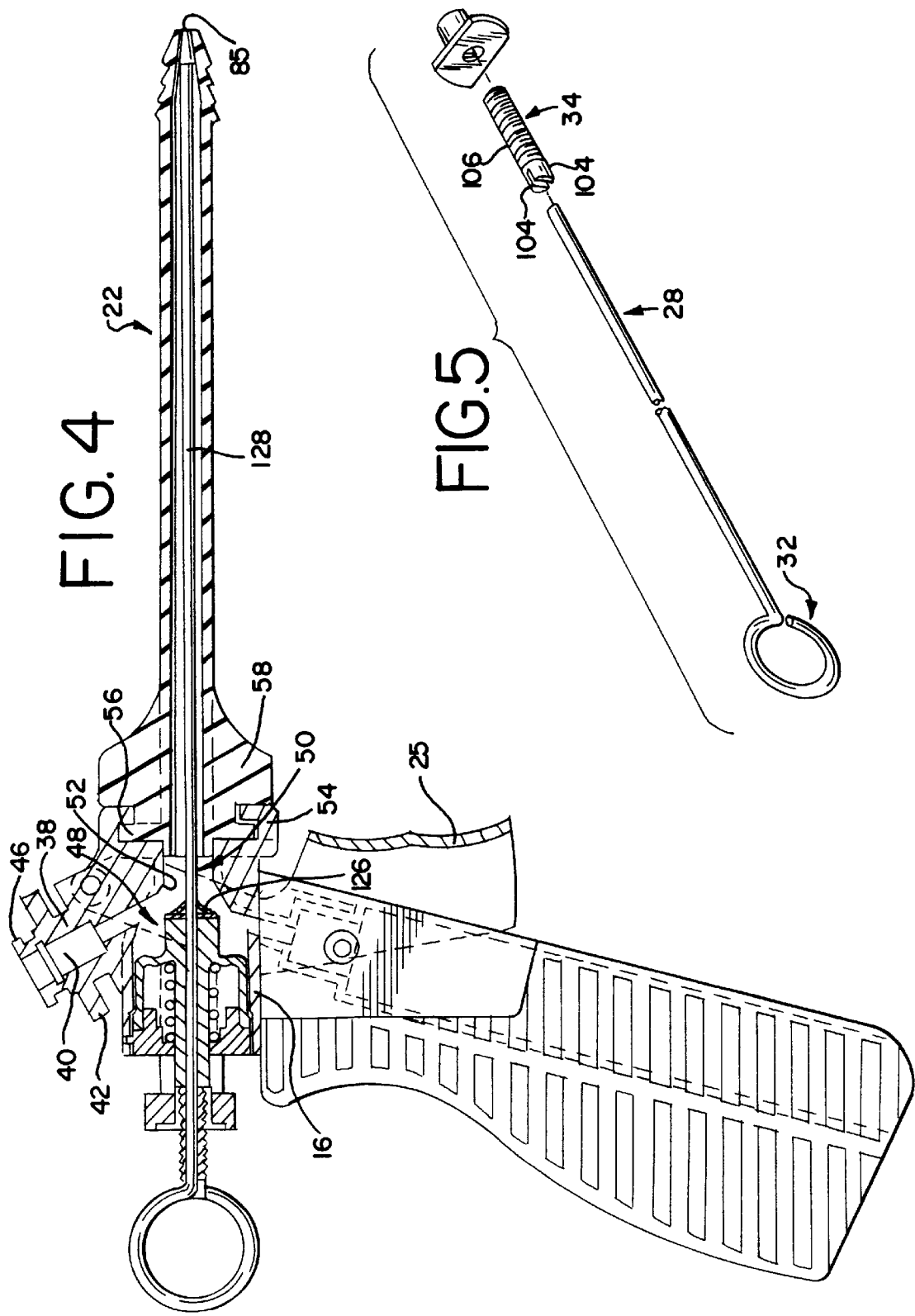

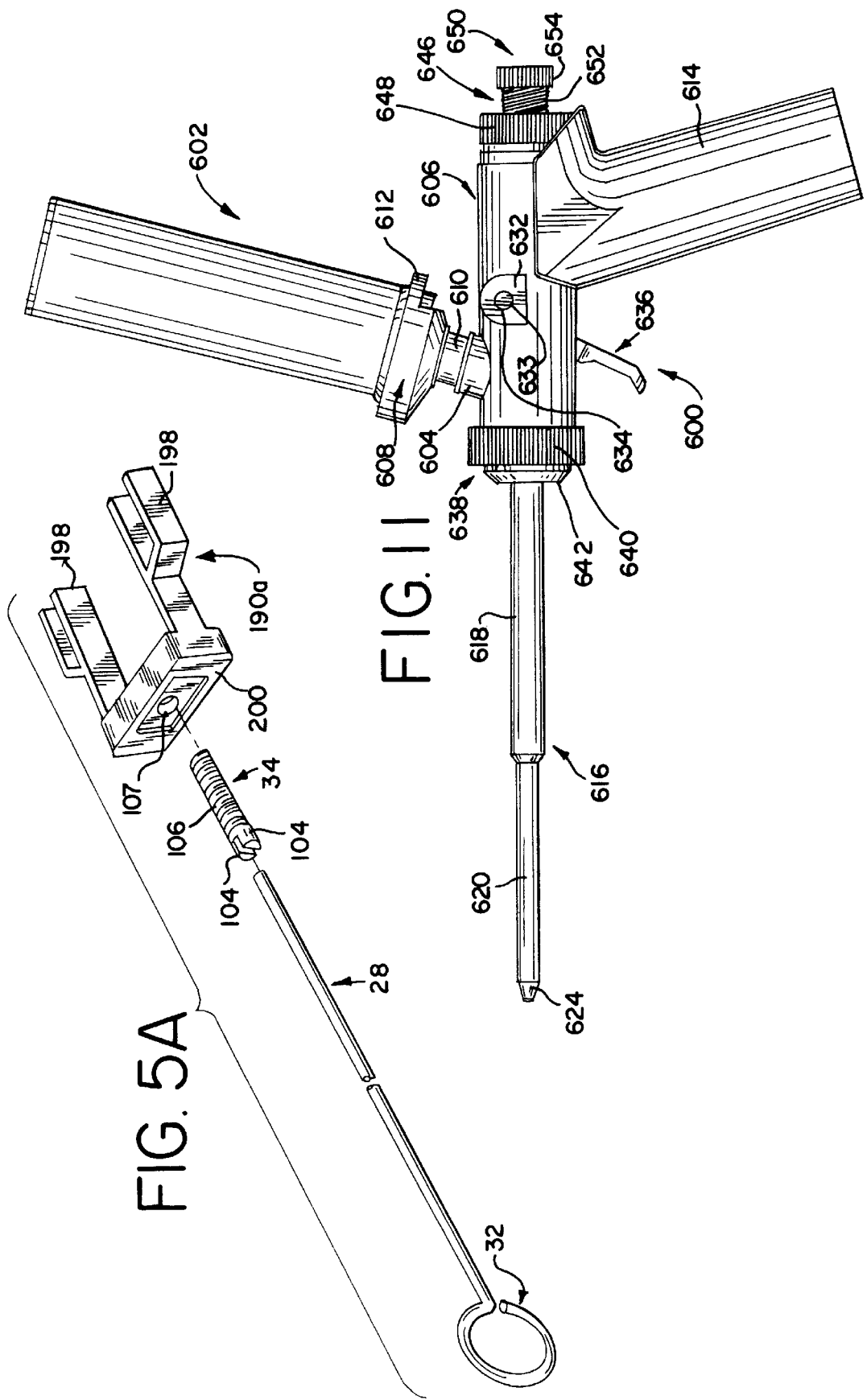

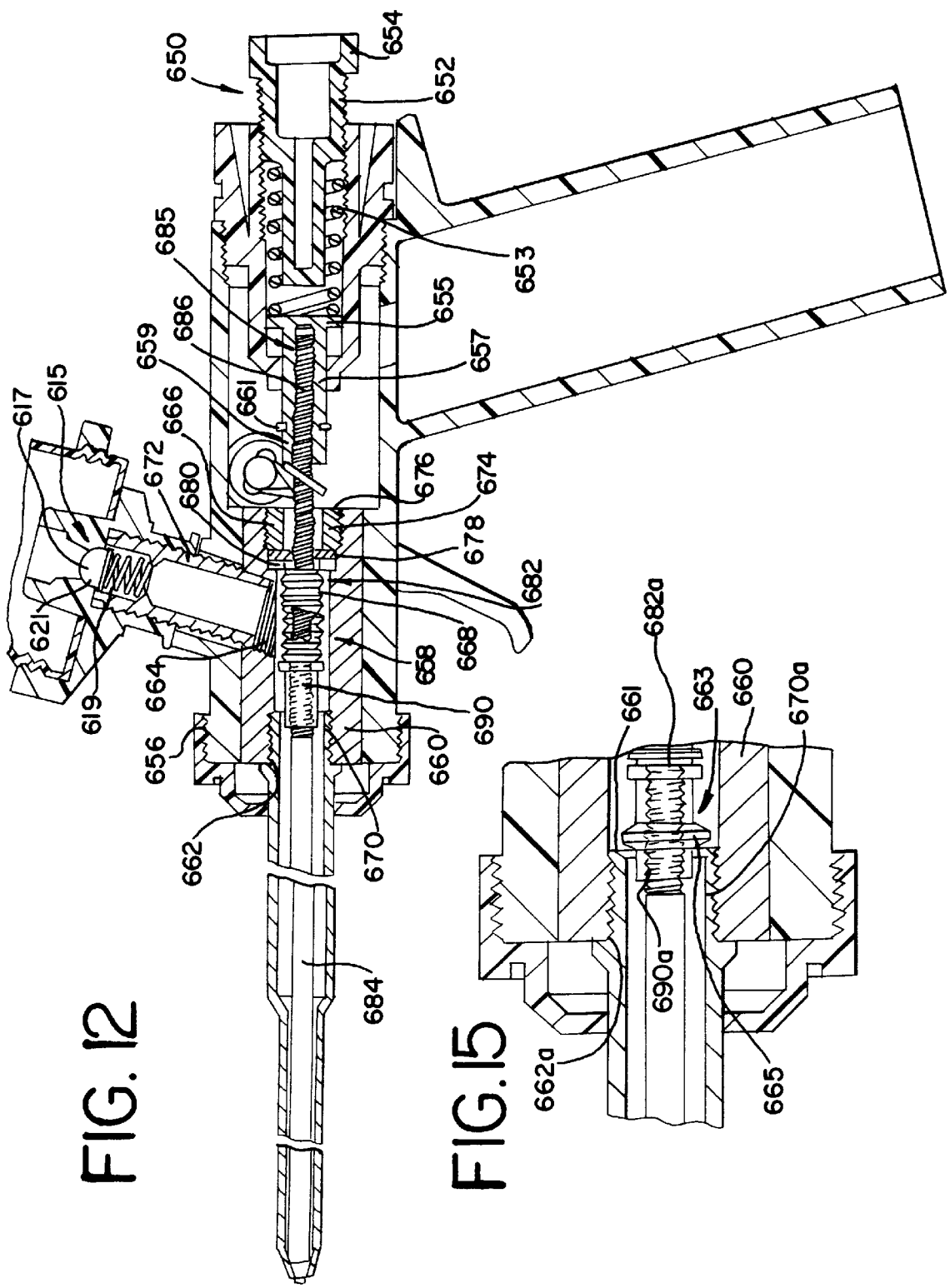

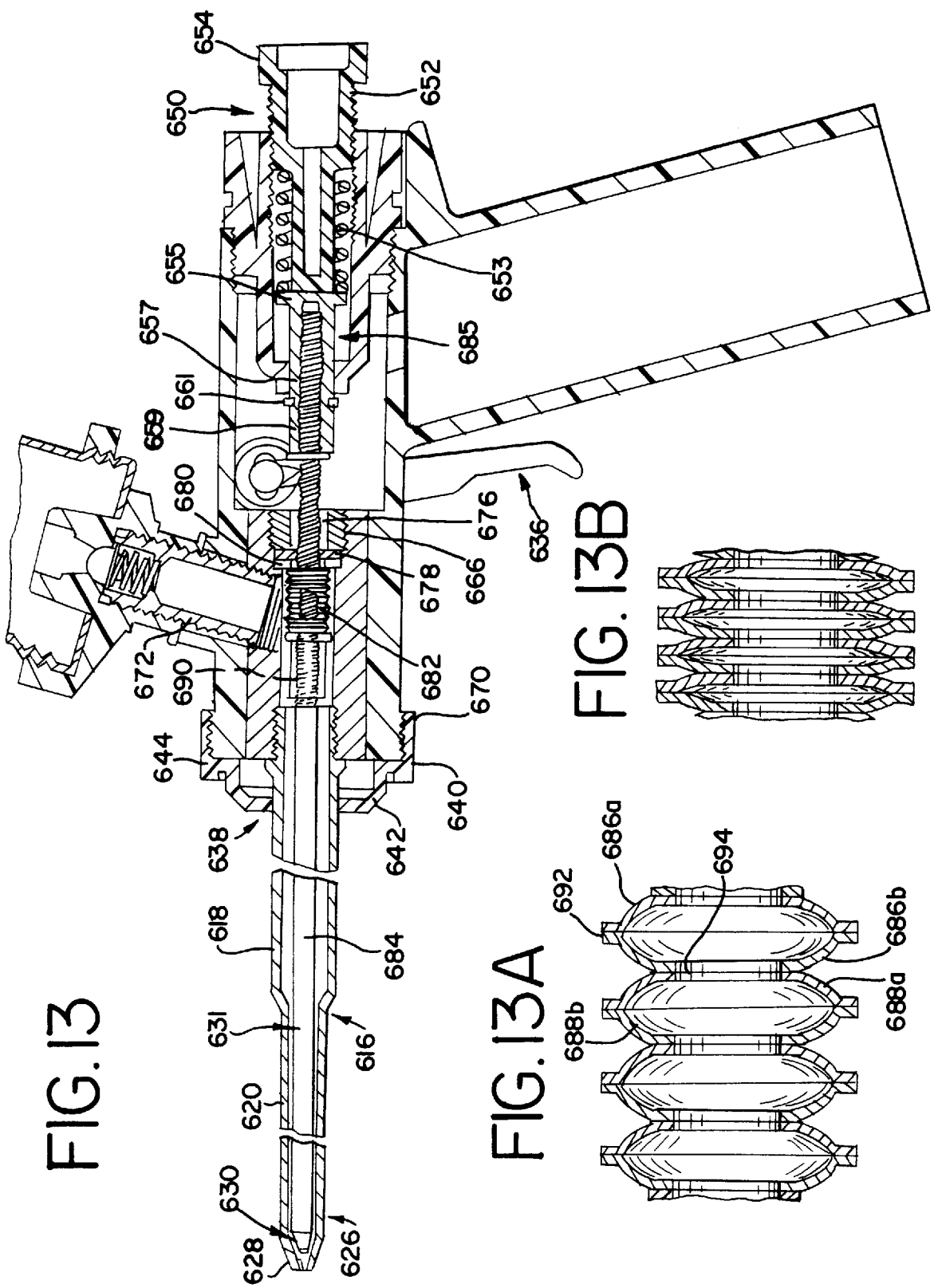

DISPENSING GUN WITH VALVING ROD AND BELLOWS-TYPE SEAL

This application is a continuation-in-part of application Ser. No. 08/264,641, filed Jun. 23, 1994, now U.S. Pat. No. 5,615,804.

BACKGROUND OF THE INVENTION

The present invention relates generally to various dispensing apparatus for fluent products, and more particularly, to hand-held guns for use in accurate dispensing of such fluent products.

By way of example, products which may be dispensed using the apparatus of the invention include so-called single component chemical foams, such as single-component urethane foams; various so-called silicone compositions, including silicone foams; caulking products such as acrylics, silicone-acrylic, silicone or other caulks and sealants; adhesives, such as those used in laminating or the like; and miscellaneous other products where a strip, bead or spray of the product is desired to be dispensed under careful control.

While the dispensing guns of the invention advantageously achieve their objects by including an attachment for an aerosol of like pressurized can, the guns are designed so that, with minimum modification, they may be fed from a cartridge or from a hose secured to the gun at one end and to a bulk container of a dispensable fluent product at the other end.

It is well-known that many products which may be stored and merchandised in cans and then dispensed therefrom are already satisfactory from a product standpoint. However, it is often difficult to dispense and apply such products to the satisfaction of the user, because of the manner in which the cans are pressurized and, more particularly, because the dispensing valves fixed to the cans are very inexpensive and not adapted for relatively precise dispensing. A great deal of skill is required to manipulate some such dispensing nozzles. Still others, regardless of the degree of care or skill applied, are simply designed to dispense products at a high rate or not at all.

The shape of the product container, normally a can, also often makes product application difficult. In particular, most relatively viscous products are dispensed with the can held in an inverted position, because of the nature of the contents and the pressurization system. This arrangement, plus the need to keep the body of the can away from the work area, results in an awkward position of the hands and fingers relative to the work site. The work site is often obscured by the can and attempting to manipulate the can while holding the same inverted and steady is a tedious task.

As a result, a number of adapters and the like have been proposed whereby cans may be associated with adapter-dispenser and held away from the work. Such arrangements have, in some instances, provided improved visibility and ease of manipulation. However, most or all of such systems have suffered from the drawbacks of the dispensing gun valve. Thus, if there are inherent limitations in the dispensing mechanism, simply locating the can better or move conveniently will not improve the dispensing action. When such an action is inherently imprecise or undesirable, this aspect simply carries over to the dispensing apparatus.

Regarding dispensable fluent but viscous products, such as expanding and non-expanding chemical foams, including single component urethanes, caulks, and the like, several drawbacks have been encountered. First, the user often desires to lay down a rather narrow bead of material in one instance and a wider, higher bead in another instance. While bead size can sometimes be controlled when dispensing caulks from a caulking gun, the inherently intermittent nature of the manual trigger dispensing mechanism virtually guarantees a pulsating type delivery. Where a pressurized can is used, this aspect can be overcome but controlling bead size for one application and then later changing to another size, particularly a smaller size, is not possible, especially where the size is determined by cutting off the nozzle end. This applies equally to caulking tubes and guns. Regarding more fluent products, control of discharge consistent with acceptable dispensing rates is still a significant problem.

Certain prior art dispensers for single component products have suffered from other drawbacks, including difficulties arising when a part of the valve component or other part of the dispensing mechanism was locked shut after a short period of non-use by the adhesive action of the material being dispensed. Almost all urethanes make excellent adhesives, but if the dispensing operation is intermittent, problems of undesired internal adhesions can arise as a result of allowing the apparatus to remain for a period of time when a component is filled with the foam or other product being dispensed. This is partially true when the material is cured by moisture in the atmosphere.

In view of the above and other shortcomings in prior art apparatus for dispensing viscous products, it is an object of the invention to provide one or more improved guns or the like for dispensing fluent products.

Another object of the invention is to provide an improved apparatus for dispensing more or less viscous products which are naturally adhesive in nature and which tend to clog dispensing apparatus.

A further object of the invention is to provide one or more styles of dispensing guns which are able to provide a metering action for the product being dispensed and wherein the width or height of a bead of the dispensed product, or a spray pattern can be easily adjusted and maintained at a desired level.

A still further object of the invention is to provide dispensing guns for fluent products which guns can be manufactured at extremely low cost, particularly in view of their advantages and characteristics.

Yet another object of the invention is to provide a gun which is adaptable, without material change, to dispense products either from bulk containers through attachment by a hose or the like, or to dispense products from an aerosol can or like container removably affixed to the gun.

Another object of the invention is to provide guns with various novel valving arrangements for controlling flow of the products to be dispensed.

A further object of the invention is to provide guns that may have removable nozzles, including elongated central passages and annular inner surfaces serving as the seats for valving rods forming parts of the guns.

A still further object of the invention is to provide a valving system wherein two valves arranged in series are operated by a common mechanism, and in which the rate of dispensing or bead size of the product dispensed can be regulated by adjusting the position of the valves relative to each other and to parts of the gun.

Yet another object of the invention is to provide a gun which includes a valving rod that may be easily rotated without tools, as by the fingers only, for example, relative to the nozzle within which it reciprocates, so as to free any adhesive connection which may have formed between the rod and the nozzle.

Another object of the invention is to provide a dispensing gun wherein manipulation or adjustment of a valving rod can act to preset the size of the bead of material being dispensed.

A further object of the invention is to provide a valving arrangement in a dispensing gun whereby, with a proper adjustment setting of a pair of cooperating valves, a bead of material may be dispensed without the need for manipulating the gun trigger.

A still further object of the invention is to provide a novel valving arrangement including a rod, and a rod handle mechanism made at extremely low cost and cooperating with counterpart elements forming a part of the trigger mechanism.

Yet another object is to provide a dispensing gun having a handle, a center outlet passage and a first valve having a core, a seating portion, a valve spring and a skirt or sleeve surrounding the valve spring, with a rod extending through the valve core and into a nozzle having a reduced diameter outlet passage adapted to be closed off by the valving rod.

A further object of the invention is to provide a gun or like dispensing apparatus having a variety of constructions each serving to cooperate with the dispensing valves of an aerosol or like pressurized container.

A still further object of the invention is to provide a valve and/or valve rod positioner having various forms of an adjustment feature.

An additional object of the invention is to provide, in one embodiment, a more expensive, sturdier gun for dispensing single component insulating foams, caulks, adhesives and like products, in and which such gun includes a novel seal arrangement insuring that a reactive product being discharged will not set up within the gun body.

Another object of the invention is to provide an improved form of gun wherein the discharge valve is advantageously operable for both expanding and nonexpanding products.

Yet another object of the invention is to provide a dispensing valve and seal arrangement for use in connection with a discharge nozzle wherein the primary seal may be situated at either end, or at both ends, of the discharge nozzle.

A further object of the invention is to provide a valving arrangement which includes a valving rod and a seal of the bellows-type to permit continued use without allowing the material being discharged to harden in the seal area between the rod and the valve body or other portions of the gun.

A still further object of the invention is to provide a gun wherein the discharge nozzle may be hand-removable, removable with the use of tools, or may not be separately constructed so as to be removable at all.

An additional object of the invention is to provide a gun wherein the components such as the valve stem, the nozzle, a bellows-type seal, and various aspects of the triggering and adjustment features are separately provided for and wherein the entire gun may be disassembled for maintenance or repair with the aid of simple tools and equipment.

Another object of the invention is to provide a sophisticated gun which is rugged and simple and which provides novel advantages and characteristics in use.

Yet another object of the invention is to provide a seal that has minimal resistance to axial expansion-contraction, but which has extremely high radial compressive strength.

The foregoing and other objects and advantages the invention are achieved in practice by providing a novel dispensing gun having a body with product inlet and outlet passages, a nozzle communicating with the outlet passage, a trigger unit and a single or double valve arrangement actuated by the trigger. In the two-valve form, a first valve has a reciprocable, seat-engaging nose portion movable in the product outlet passage between open and closed positions and a valving rod with a shank extending through the first valve, through a passage in the nozzle and having a free end closing off an inner, preferably tapered, end portion of the nozzle.

In one form of the single valve gun, the seal is formed at one end or another of the nozzle, and a bellows-type seal insures an effective, long-lived seal between the valving rod and the exterior of the gun.

The manner in which the foregoing and other objects and advantages of the invention are achieved in practice will become more clearly apparent when reference is made to the following detailed description of the preferred embodiments of the invention set forth by way of example and shown in the accompanying drawings, in which like reference numbers represent corresponding parts throughout.

BRIEF DESCRIPTION OF THE DRAWINGS

FIG. 1 is a side elevational view of the dispensing apparatus of the invention;

FIG. 2 is a fragmentary rear elevational view of the apparatus of FIG. 1, taken along lines 2, 2 thereof;

FIG. 3 is a side view, partly in elevation and partly in section, and showing the valve components of the apparatus in a first position of use;

FIG. 4 is a view similar to that of FIG. 3, but showing the trigger and certain of the valve components in another position of use;

FIG. 5 is an exploded view, partly diagrammatic in character, and showing the arrangement of the valving rod and two of the components for adjusting the position of the valving rod;

FIG. 5A is an exploded view of a modified form of adjustment mechanism for the valving rod, including the yoke, the rod and the adjuster;

FIG. 7 is a fragmentary side view, partly in elevation and partly in section, showing another form of connector for cooperative relation between a can valve and a portion of one form of gun body;

FIG. 11 is a side elevational view of a further modified form of gun embodying the invention;

FIG. 12 is an enlarged vertical sectional view, partially fragmentary in character, showing the principal components of the form of gun shown in FIG. 11 and showing the valve in the closed position;

FIG. 13 is a view similar to that of FIG. 12, but showing the trigger, and components of the valve and seal in an open position of use;

FIGS. 13A and 13B are enlarged fragmentary sectional views of portions of the bellows-type seal used in the gun of FIGS. 11–13;

FIG. 15 is an enlarged fragmentary vertical sectional view of a modified form of valve construction embodied in one form of gun made according to the invention.

DESCRIPTION OF THE PREFERRED EMBODIMENTS OF THE INVENTION

While the dispensing gun of the invention may be embodied in a number of different forms, and certain of the parts may be constructed and arranged in a different manner, a detailed description will initially be given of one form of apparatus which is extremely economical to manufacture and which provides a number of advantages in use. Subsequently, other versions will be described.

Figure 6:
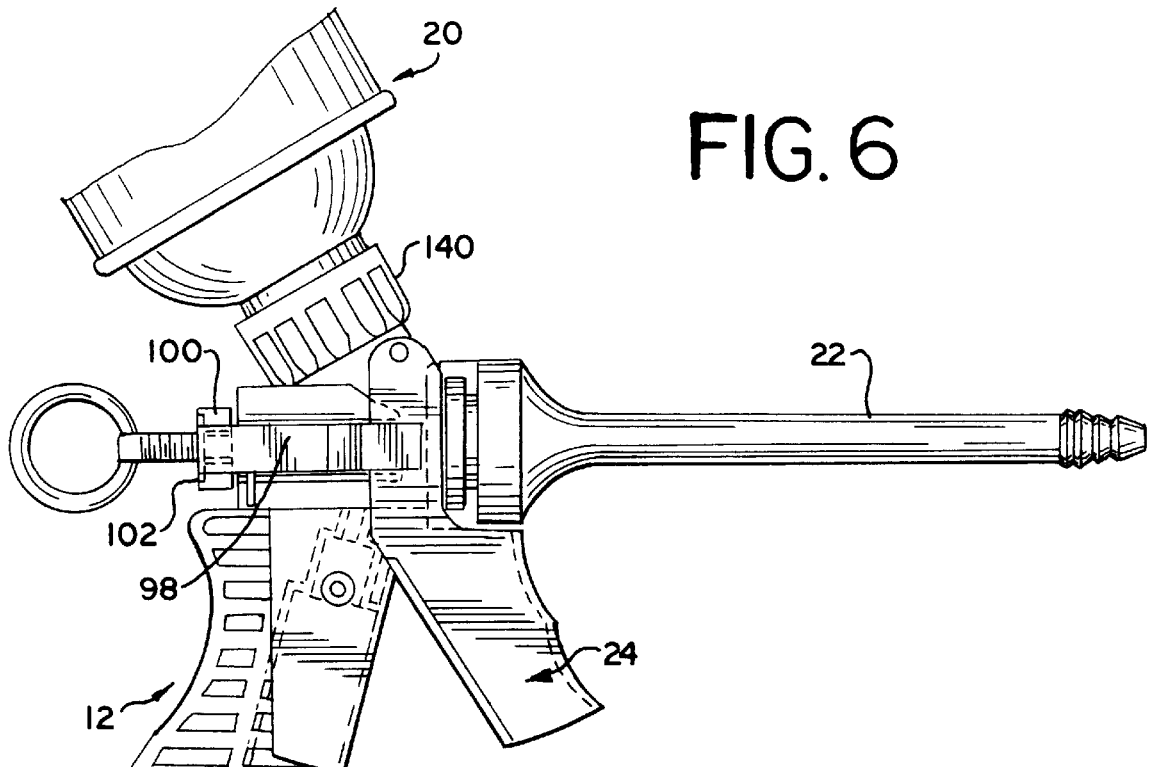
FIG. 6 is a view similar to that of FIG. 1, but showing a pressurized dispensing can positioned on the gun and a portion of the product supply hose, useful with another form of the invention.

Referring now to the drawings in greater detail, FIGS. 1–4 show the apparatus to be embodied in a gun generally designated 10 and having a number of principal components. These include a gun body generally designated 12 and shown to have a handle portion 14, a valve housing portion 16, and a fitting generally designated 18 for locking engagement with an associated aerosol can generally designated 20 (FIG. 6). In addition, the gun includes a detachable dispensing nozzle designated 22, a trigger generally designated 24, a trigger yoke 26, and a valving rod generally designated 28 (FIG. 5). In keeping with the invention, an internal valve assembly generally designated 30 is an important element of the invention.

Other important elements of the invention include the loop-like handle generally designated 32 on one end of the valving rod, a rod positioning or adjusting sleeve generally designated 34, and a threaded yoke insert generally designated 36.

Referring again to the gun body 12, the fitting 18 for cooperatively receiving the aerosol can 20 in locking relation includes a cylindrical body 38 (FIG. 4), having walls defining a center product inlet passage 40. A locking mechanism in the form of a pair of large, partly cylindrical ears 42 separated by reliefs or notches 44 extend outwardly from the body 38. The outermost end of the body 38 includes a smaller, continuous radial flange 46.

The center product inlet passage 40 extends inwardly into an annular product discharge area generally designated 48 and shown to be comprised of inner surfaces forming the valve body 16 of the gun. A product outlet passage generally designated 50 is defined in part by an annular valve seat surface 52, a portion of which may be tapered. Flanged partial sidewalls 54 with cutouts or reliefs are provided for registration with a pair of twist-and-lock ramp surfaces 56 forming ears on the inner end portion 58 of the nozzle 22.

As shown in phantom lines in FIGS. 1–4, the handle 14 optionally includes an inner passage 60 defined by cylindrical sidewalls 62 for accommodating a hose 64 (FIG. 6) having a press-in fitting 66 on the end thereof. The press-in fitting 66 is receivable within a reduced diameter recess 68 formed by sidewalls 70; a product inlet passage 72 extends upwardly from the recess 68 and into the product discharge area 48. According to the invention, because a can or a hose may be used to supply a single component product, either the passage 72 or the passage 40 may be closed off or blinded so as to prevent leakage when one of the passages is not to be used. Conceivably, if two separate components were to be supplied, both passages could be utilized at the same time.

Referring again to the nozzle 22, the outer end 74 therein is tapered inwardly and terminates in a product dispensing opening 76. The interior sidewall 78 defines an elongated passage 80 for the product. The passage 80 terminates in a tapering, frustoconical seating surface 82 for the forwardmost portions of the outer tip 84 of the valving rod 28. As will be described in detail elsewhere herein, the combination of the cylindrical rod and the tapered valve seat help control product discharge conditions.

As shown in FIGS. 1 and 3, the finger-engaging portions 25 of the trigger assembly 24 are adapted to pivot about the axes of left or right hand pins 82 each extending through an opening in the ears 84 on top of the trigger. Each of the flanks or sidewalls 86 of the trigger includes a rear contact surface 88 received within a slotted yoke generally designated 90 and shown to include spaced apart, forwardly directed, inner and outer flanges 92, 94., The finger-engaging forward surfaces 25 of the trigger 24 are operative to pivot the trigger about the pivot axis 82 and move the yoke 90 backwardly.

As is further shown in the drawings, the yoke includes a pair of legs 98 (FIGS. 1, 6) movable in slots 99 (FIG. 2) and a transverse bar 100 for positioning and moving the valving rod 28. The bar 100 includes a center opening into which a threaded yoke insert 36 is secured by a press fit.

In keeping with the invention, a tubular adjusting sleeve 34 (FIG. 1, 5) includes a pair of spaced apart locking ears 104 and a threaded shank portion 106. During manufacture, the adjusting sleeve 34 is pushed fully onto the rod 28, and the tabs 104 are crimped inwardly to engage adjacent portions of the rod handle 32 and lock the two members against relative rotation. This converts the ring 32 into a twist handle that affords great mechanical advantage relative to the rod shank, and makes it easy to rotate the rod, even if stuck by an adhesive, relative to the nozzle.

Referring now to FIG. 5A, a variation in the form of an adjustment feature depicted in FIG. 5 is shown. Here, the valving rod generally designated 28, the loop style handle end generally designated 32 and the adjusting sleeve generally designated 34 are the same. In the instance of FIG. 5A, however, a yoke generally designated 190a is shown to have left- and right-hand legs 198, as well as a transverse rod-engaging bar 200. The transverse bar 100 includes internal threads 107 which cooperate with the external threads on the shank portion 106 of the adjusting sleeve 34.

Another important element of the dispensing gun is the main operating valve generally designated 30. This unit is preferably made from a single piece of rubber or plastic and includes (FIG. 3) a cylindrical center core 108, a forwardly extending nose portion 110 with a cylindrical outer seat-engaging surface 112, and a contoured flexible protective skirt 114. The skirt includes a rear margin 116 having a locking bead 117 forming its remote end; the skirt 114 also defines an inner space 118 in which a coil-type valve return spring 120 is positioned. One end of the spring 120 bears against a shoulder 122 between the valve core 108 and the inner margin of the skirt 114. The locking bead 117 of the skirt is positioned by an end piece 124 which locks the skirt relative to the valve body and also provides a perch or reaction surface to engage the other end of the valve spring 120. The contoured skirt 114 of the valve 30 is flexible and when the core is pulled rearwardly, the contoured surface of the skirt telescopes upon itself as shown in FIG. 4. This inherently increases its radial stiffness, preventing its collapse upon the spring 120. This action frees the cooperating seating surfaces 112, 52 on the valve nose and the valve housing respectively, to permit product to flow from the annular space 48 to the nozzle passage. By moving the rod which is secured to the main valve 30, the end 84 of the rod unseats from the taper 82, allowing product to pass out the nozzle.

In the embodiments of the invention shown in FIGS. 1–6, and particularly as shown in FIGS. 3 and 4, the main operating valve is shown as having a core 108 and a contoured flexible protective skirt 114. The skirt portion is intended to provide sufficient stiffness that pressure inside the valve body will not cause radial collapse of the skirt which would cause the skirt to surround the compression spring and interfere with its operation. As shown in FIG. 4, where the nose is retracted, a portion of the skirt 114 between the nose and the cylindrical portion of the skirt is capable of folding back on itself so as to lie inside of and in supporting relation to the cylindrical portion of the skirt. This provides further support and additional stiffness against radial collapse, particularly when the valve is open and the contents of the can are flowing. It will be understood in reference to FIG. 4 that the nose of the valve is capable of achieving a further retracted position wherein additional support for the skirt would be provided.

In the preferred form of apparatus the valving rod is locked against axial movement relative to the nose of the valve core by an inexpensive spring steel "Tinnerman" or like locking fastener 126 wedged about the outer diameter of the shank 128 of the valving rod 28.

Referring now to the use of the gun, it will be assumed that a can of fluent material, such as a can 20, contains a low-expansion but foamable material such as a single-component urethane foam. The can and fitting 140 are manipulated such that parts of the fitting mate with the flange ears 42 on the cylindrical body 38. This places the stem (not shown) of a Clayton valve or the like within a passage 40 and secures same in fluid-tight relation. For this purpose the small radial flange 46 abuts a surface on the can valve. Axial movement of the can valve in a known manner permits contents of the can to begin flowing into the annular product discharge area 48.

With the trigger and valve in position of FIG. 3, the main valve 30 is closed and the product cannot escape as long as the seating surfaces 112 on the nose of the valve and the valve seat surface 52 are in contact. When the trigger is actuated, it swings through an arc and, depending on the relative position of the yoke 26, as is discussed elsewhere herein, the rear surfaces of the trigger engage the yoke 26. Continued trigger movement pulls the valving rod 28 and the valve core 108 rearwardly, separating the seating surface 52, from the nose 112 at the same time the far end 84 of the valving rod 128 withdraws from the tapered surfaces 82 on the forward portion of the nozzle. This also opens the passage 85 (FIG. 4) inside the tapered surface 84. Thus, the product is permitted to flow out the body outlet passage 50, into the interior nozzle passage 80, and ultimately, to the point of application. The two valves open with the same action because the yoke, acting through the insert 36, carries the threaded sleeve 34 and thus the valving rod 28 and the valve core 108 to the rear.

An important feature of the invention is the adjustability of the valving rod relative to the other components, particularly the yoke 26.

As will be noted, the cooperating threads on the yoke insert 36 and the adjusting sleeve 34 permit adjustable relative motion of these parts. As long as the valve nose 112 remains seated on surface 53, rotating the rod, and hence the sleeve, backs the yoke toward the rear (to the left in the figures). In this position, a lost motion space is formed between the rear surface of the trigger and the engagement point on the yoke 26. Because of this, the rear surfaces of the trigger do not actually engage the yoke until the trigger has been depressed considerably. Moreover, since the movement range of the trigger is limited, there is little motion left to unseat the valves 30, 84.

This lost motion simply means that the nose of the valve moves only slightly off the tapered seating surface 52, and only a small amount of product will flow. Since the rod and the valve core are secured so as to move together, a small opening of the valve 30 results in a proportionally small opening between the tip 84 of the rod and the tapered rod seating surface 82. Under these circumstances, a very low flow rate can be achieved because, even with a full pull of the trigger, very little of the valve is opened. Thus, suitable adjustments may be made to secure a very low dispensing rate.

Referring now to another use of the threaded or other adjustable connection between the yoke and the operating rod, a suitable adjustment may be made in the other direction with another result. Here, the ring is manipulated so that the yoke and rod move relative to each other not only to their normal positions, such as that shown in FIG. 3, but the ring is further rotated until, with the forward face of the yoke engaging the end piece, continued rotation actually begins to pull the valving rod and the core within which it is locked to a retracted position, against the force of the return spring. In this way, the valve 30 is slightly opened as the rod pulls the nose of the core off its seat. By proper manipulation, this can serve as a vernier adjustment to the valve and the rod and dispensing will commence at a low rate. In this way, once the rod is manipulated until a desirable flow rate is achieved, it is not necessary to use the trigger at all.

Accordingly, the provision of the adjustment between the rod and the yoke, with the valve core being secured to the rod, permits various operational capabilities. In the normal operation, the rod is placed somewhat in the middle of its travel and the trigger engages the yoke early in the stroke of the trigger, permitting a wide variation in dispensing rates. Adjusting the rod such that there is much lost motion between the trigger and the yoke reduces the maximum potential discharge rate, and adjusting the rod in the other direction can serve to open the valve and permit dispensing with no trigger action.

This ability to create a fine adjustment at extremely low cost, i.e., by making the adjusting sleeve in the form of a simple part that may be crimped on to the valving rod is a significant advantage of the invention. Likewise, the arrangement of the main valve with its carrier yoke and the spring enclosed within a flexible skirt provides isolation of the operative components from the product being dispensed.

Referring now to other embodiments of the invention, for example, FIG. 7 shows a form of gun generally designated 210 having a fitting generally designated 218 for attachment to an aerosol can generally designated 220. The portions of the gun other than those comprising the fitting 218 are generally the same as those of their counterparts in FIGS. 1–4, for example.

In the embodiment of FIG. 7, the fitting 218 includes a generally cylindrical body portion 222 having sidewalls 224 defining a small diameter central passage 226 extending into the gun. Enlarged diameter exterior walls 228 define a guide body 230 which, in use, engages a sidewall portion 232 of the contoured carrier generally designated 234 for a can valve assembly generally designated 236. The carrier sidewall 232 lies between the mounting curl 238 and a shoulder 240 on the valve carrier 234.

The carrier 234 includes a recessed or countersunk portion generally designated 242 having course threads 244 or the like, the contours of which match and mate with external threads 246 on the uppermost or nose portion of the fitting 218. The valve assembly 236 includes a spring portion 248 biasing the valve closed, and an axially movable core, the end portion 250 of which engages an end face surface 252 in the counterbore 254 of the fitting 218. Tapered or countersink surfaces 256 in the fitting 218 also mate with the frustoconical alignment surfaces 258 on the body of the valve 236.

Accordingly, in use, the can and the gun are aligned as shown in FIG. 7, and with the thread sets 244, 246 engaging each other and the can being rotated at least a full revolution, the can is positioned in a stable manner by the fitting. When the threads are mutually engaged, the guide surfaces are also properly engaged, with the extent of axial engagement being limited by cooperating surfaces on the can and the fitting respectively. The last portion of the rotation enables the end face surface 252 to depress the nose of the valve core 250 (moving it upwardly as in the orientation of FIG. 7), thereby allowing the can contents to flow into the inlet passage within the body of the gun 210.

Figure 8:
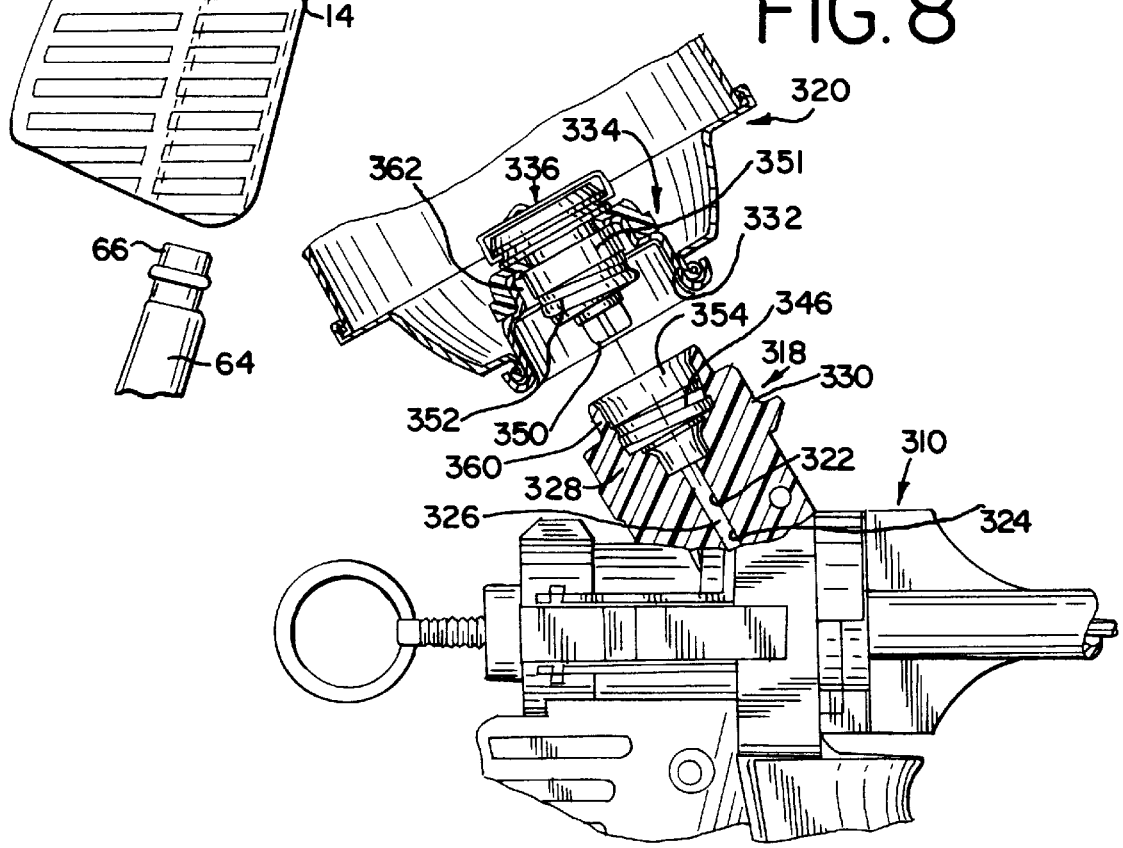
FIG. 8 is a view similar to that of FIG. 7, but showing a modified form of connector for attaching a pressurized can to the gun body.

Referring now to FIG. 8, a construction similar to that of FIG. 7 is shown, differing therefrom only in the structural details of the can valve and of the fitting. Thus, in FIG. 8, a gun generally designated 310 is intended for use with a can generally designated 320. A fitting generally designated 318 includes portions generally similar to their counterparts in the earlier embodiment, including a generally cylindrical fitting body 322 defined by a sidewall 324 and including a reduced diameter gun inlet passage 326 extending through the fitting and into the inlet of the valve body of the gun 310.

The cylindrical fitting 322 includes an exterior flanged sidewall 330 which is intended to nest within the curl and countersink portion 332 of a carrier generally designated 334 for a can valve assembly generally designated 336. The valve includes a nose portion 350 which extends above a threaded portion 352 of the body 351 of the valve 336. The external threads 352 cooperate with internally formed threads 346 within a counterbore opening 354 in the fitting generally designated 318.

A cylindrical nose extension 360 of the fitting 318 is adapted to nest within a cylindrical recess 362 in the valve carrier 334. When the can 320 and the gun 310 are aligned as shown in FIG. 8, and the cooperating thread portions 346, 352 are engaged, the can may be rotated until the assemblies bottom out with respect to each other.

At this point, the nose 350 has been pushed axially upwardly as shown in FIG. 8, opening the valve on the can 320. The nose extension 360 and the contoured sidewall 330 engage their counterparts on the valve carrier, providing a rugged, leakproof connection. In other respects, the apparatus functions in the same manner as its counterpart in FIG. 7. In both these embodiments, the can may be removed without loss of contents by rapidly unscrewing the same if this is desired for any reason.

Figure 9:
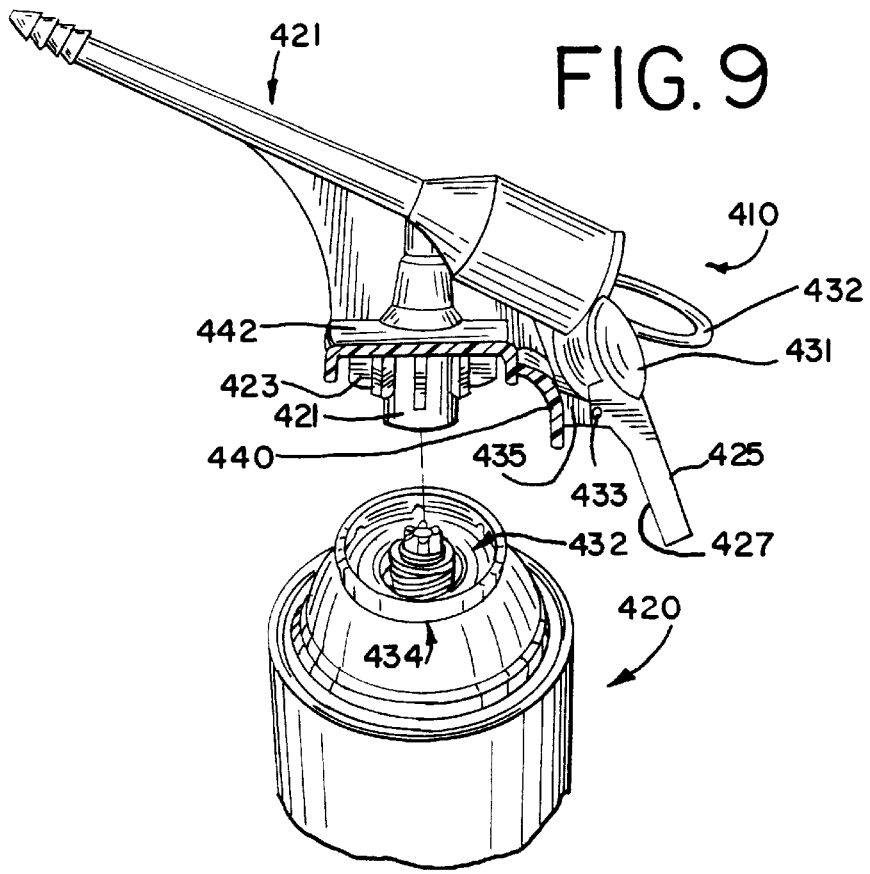
FIG. 9 is a perspective view of another embodiment of the invention, showing one form of attachment between the gun and an associated pressurized container for fluent products.

FIG. 9 shows another form of gun embodying certain features of the invention. This gun, generally designated 410, is shown to be associated with a can generally designated 420. In this case, the internal components of the gun of FIG. 9 are similar to those of their counterpart in FIGS. 1–4, except that the dispensing nozzle generally designated 42 is not removable. Moreover, a trigger assembly 425 includes a finger grip portion 427 and an actuator portion 431 of generally cup-shaped form. The trigger pivots about the axis of a pin 433 located on a bracket 435 extending outwardly from a skirt 440 of the adapter fitting portion 442 of the gun 410. In use, rotating the finger grip 427 through an arc causes the actuator 429 to pull back the closed loop handle 432 on the rear end portion of the valving rod.

Regarding the can 420, the construction of the valve assembly generally designated 434 is the same as its counterpart in FIG. 8. The adapter portion 421 includes interior surfaces similar to those shown in FIG. 8. The only difference in the construction is that, in the embodiment of FIG. 9, the adapter fitting, instead of a smooth outer sidewall, includes a plurality of locating ribs 423 extending radially outwardly and into engagement with the inner surfaces 432 on the valve carrier generally designated 434. In use, the gun of FIG. 9 functions similarly to that of the other embodiments and mounting of the elements is also the same as that in the other embodiments. Adjustment of the trigger action is achieved by rotating the loop handle 432, and the interior valving is similar to the valve assembly generally designated 30 in FIGS. 3 and 4.

Figure 10:
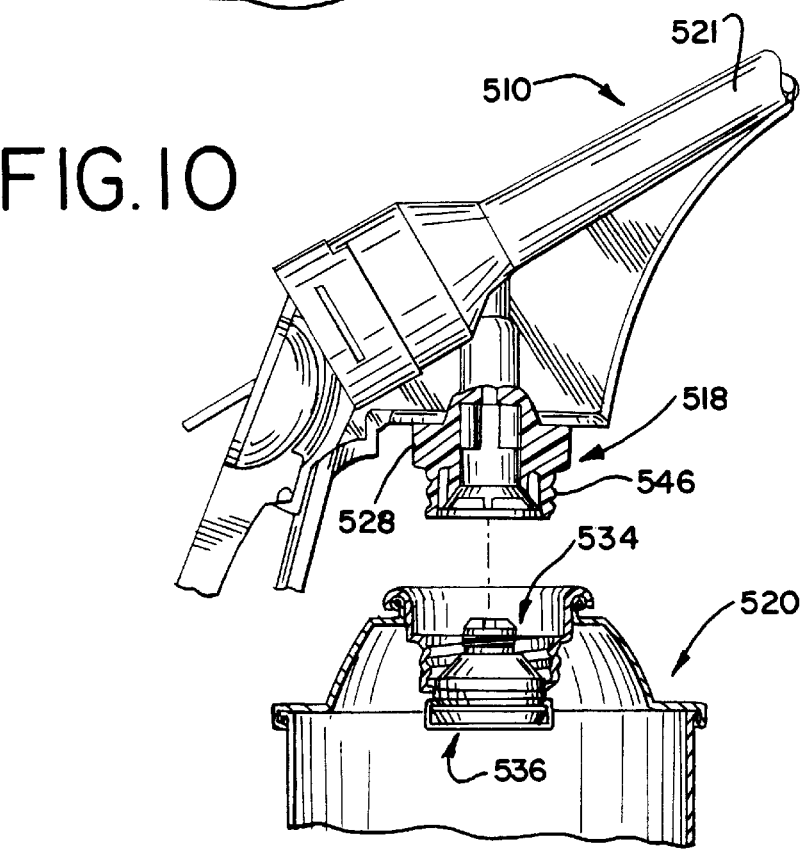
FIG. 10 is a fragmentary side view, partly in elevation and partly in section, showing the form of connection between the form of gun shown in FIG. 9 and a can containing fluent products.

Referring now to FIG. 10, a gun generally designated 510 is shown to be provided for removable association with a can 520. Here, the valve carrier generally designated 534 of the can 520 carries a valve generally designated 536 in the same way as its counterparts 434, 436 in FIG. 7. A fitting generally designated 518 contains external threads 546 and guide surfaces 528 similar to their counterparts in FIG. 7. The internal valving of the gun is the same as that of the gun shown in FIGS. 1–4, but the gun of FIG. 10 has a nozzle 521 which is not removable, i.e., it resembles its counterpart in FIG. 9 rather than that of FIG. 3.

FIG. 11 shows a quite different form of gun generally designated 600, and having a number of different characteristics and operational features than the guns illustrated in FIGS. 1–10. Referring to FIG. 11, a gun generally designated 600 is intended for use with a supply hose (not shown) or with a can or other container of fluent product generally designated 602 which may be affixed to the gun body is shown. In the alternative, a fitting generally designated 604 and forming a part of the gun body generally designated 606 may be used to accommodate a hose communicating with the source of fluent product.

Assuming that the gun 600 is intended for use with an individual container, the fitting 604 is provided with an adapter generally designated 608 having a reduced diameter neck portion 610 and an enlarged diameter can holder 612. The can holder 612, which may, in the alternative, comprise a fitting to receive a product supply hose, is shown to include an anti-backflow check valve assembly generally designated 615, and having a ball 617, a spring 619 and a ball seat 621. This insures that contents of the gun body do not flow backwards and so that moisture cannot penetrate to the gun interior when a container or hose is removed.

The principal portions of the gun shown in FIG. 11 include, in addition to the gun body 606, a handle unit 614, a nozzle generally designated 616 and shown to have an enlarged diameter portion 618 located closely adjacent the gun body 606 and a reduced diameter portion 620 terminating in a tapered discharge end 624. An outlet generally designated 626 (FIGS. 12–13) includes a tapered seating surface 628 adapted to mate with a tapered tip 630 on a valve operating rod generally designated 631.

The gun body 606 includes a boss 632 having an opening 633 therein for accommodating the shaft 634 of a trigger unit generally designated 636 to permit pivotal movement thereof. A screw cap generally designated 638 and shown to include a knurled gripping portion 640 and a tapered nose portion 642 also includes a tapped portion lying just inside the gripping portion 640 is tapped so as to be snugly received over a threaded end portion 644 (FIG. 13) of the gun body 606 to help hold the nozzle 616 in a captive position.

Figure 14:
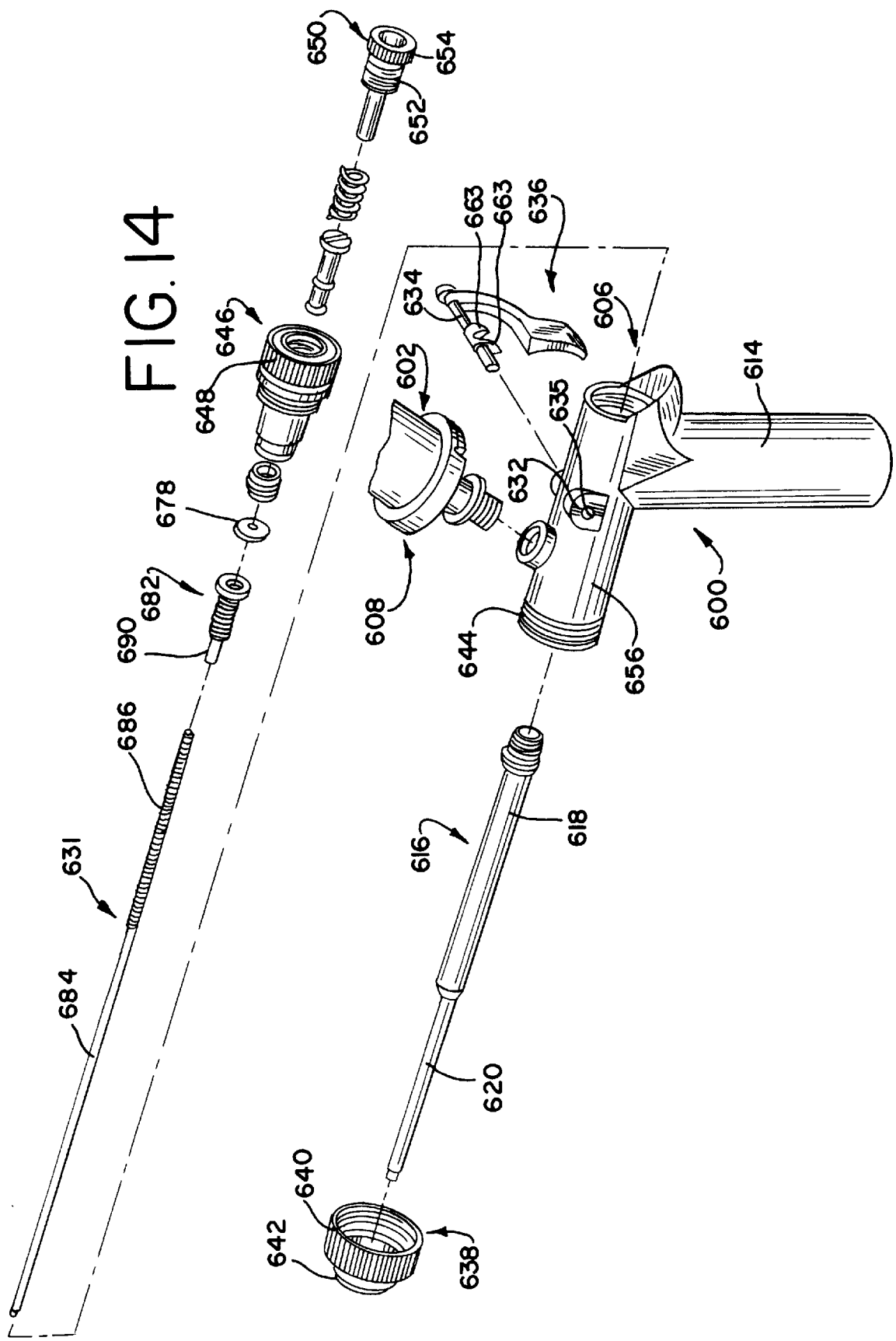
FIG. 14 is an exploded perspective view showing an assembly sequence for the form of gun shown in FIGS. 11–13.

Other elements at least partially visible in the illustrations of FIGS. 11 and 14 include an enlarged diameter return spring holder and rod guide unit generally designated 646 and shown to include a knurled or textured gripping portion 648. Threaded into the return spring holder and rod guide is a spring compressor generally designated 650 and shown to have external threads 652 and a knurled or textured adjusting knob 654. The return spring holder positions a return spring 653, one end of which bears on the enlarged, flat head portion 655 of the rod actuator 657. The actuator includes an internally threaded nose portion 659 having a snap ring 661 positioned within a groove in the nose 659. The ring 661 is adapted to be engaged by the claws 663 (FIG. 14) positioned on the trigger shaft 634 and lying to either side of the center line of the rod 631 and the actuator 657.

Referring now to FIGS. 12–14, additional constructional details of the preferred form of apparatus may be seen. Here, the gun body 606 is shown to have a front cylindrical sidewall 656 defining a chamber generally designated 658 for receiving a center body 660 preferably made from aluminum or other metal and including a tapped front opening 662, a tapped top opening 664 and a tapped rear opening 666, all communicating with a central bore 668. The threaded inner end portion 670 of the gun nozzle generally designated 616 is seated within the tapped front opening 662. A threaded adapter sleeve 672 fits snugly in the tapped top opening 664, and the tapped rear opening 666 accommodates a locknut 674 having a center opening 676 therein. The locknut 674 positions a sealing gasket 678, which in turn engages the flange portion 680 of a bellows seal assembly generally designated 682 described elsewhere herein. The center opening 676 in the nut 674 is preferably hexagonal. One portion of the valve operating rod 631 extends through the locknut 674 and the seal assembly generally designated 682.

As referred to above, the valve operating rod 631 has an elongated shank portion 684, a tapered nose portion 630, which, in its closed position rests upon its tapered valve seat 628 as described above. A significant portion of the length of the valving rod generally designated 631 is threaded, as at its threaded rear portion 686 which are used to position several components of the apparatus. These include the expansible/compressible bellows seal generally designated 682 as well as a combination trigger actuator and spring contact unit generally designated 685. As shown in FIGS. 12 and 13, the bellows seal generally designated 682, in addition to the flange 680, includes a plurality of deflectable Belleville elements 686a, 686b, 688a, 688b, etc. arranged in back-to-back relation and sealed together along seams 692, 694 joining their opposed facing outer and inner peripheries. The axially outermost end of the bellows seal assembly 682, i.e., the portion lying toward the outlet of the nozzle, comprises in an elongated, internally threaded cylindrical nose portion 690.

By reference to FIGS. 13A and 13B, and understanding that a plurality of radially outer and inner seams 692, 694, for example, are formed at the respective outer and inner peripheries of the opposed Belleville washers, it will be appreciated that axial forces in tension or compression will expand or contract the bellows forming a part of the bellows seal assembly generally designated 682. Inasmuch as the flange portion 680 of the seal assembly 682 is secured against movement, and the nose portion 690 is affixed to the reciprocable rod 631, rod reciprocation will expand the bellows to the position shown in FIG. 13A when the valve is in the closed position (FIG. 12). When movement of the trigger 646 causes the rod 631 to be withdrawn from its seat, the bellows seal is compressed axially to the position of FIG. 13B, as the rod moves to the right as shown in FIG. 13. The normal or relaxed position is one wherein the bellows is extended. According to the preferred form of the invention, the bellows is made from a stainless steel material and accordingly, great radial compressive strength is provided.

Referring now to FIG. 15, a slightly altered version of the apparatus is shown. Here, the threaded inner end portion 670a positioned within the tapped opening 662a of the center body 660a includes tapered or frustoconical surfaces 661 which form a valve seat. The head of the valve that cooperates with the seat 661 is generally designated 663 and is shown to comprise an enlarged, tapered head 665 formed adjacent the end of the nose 690a of the bellows seal assembly 682a. In the embodiment of FIG. 15, the seal at the end of the rod 631 may be eliminated, or it may be maintained so that a dual seal action is provided, as with the embodiments of the invention shown in FIGS. 1–6, for example.

FIG. 14 shows most of the principal parts of the gun 600 in their exploded relation. It is believed that the illustration is self-explanatory. However, a few features of the assembly process will be described. The assembler positions the bellows seal assembly in alignment with the threaded end of the rod 631, then rotates the seal assembly until the threads on the parts are engaged and the nose portion 690 of the assembly 682 has moved considerably forward, almost to the end of the threaded section. At this point, the trigger assembly is inserted into the body. The rod and the seal assembly, the gasket 678 and the locknut 674 are inserted into the center body 660 and locked in place. This leaves the threaded free rear end portion 686 of the rod exposed. The actuator 685 is positioned within the spring holder and guide 646, and its internally threaded nose is screwed onto the rod end, entrapping the trigger claws. The spring is then inserted and held by the compressor 650 as the positioner and rod guide 646 is screwed into the body. The nozzle is inserted into the center body 660, and the screw cap 638 covers the nozzle. This completes the basic assembly.

Thereafter, a desired adjustment may be made on the spring tension by manipulating the spring compressor adjusting knob 654 to tighten or loosen the compression on the spring 653.

In use the apparatus of FIGS. 11–15 is similar to its counterpart, except that in the versions of FIGS. 12 and 13, for example, there is only a single valve adjacent the end of the nozzle. There is nonetheless an adjustment feature between the bellows type seal 682 and the nozzle outlet 626. Similarly, screwing or unscrewing the actuator 685 relative to the free rod end 686 will position the relation between the trigger claws and the actuator. In effect, this varies the stroke of the rod in response to trigger movement. Normally, with the valve closed, the bellows seal 682 is almost fully extended. Pulling the trigger and withdrawing the rod shortens the bellow to an extent less than that needed for total collapse but approaching the position of FIG. 13B, merely by way of illustration.

The provision of the bellows assembly 682 in conjunction with a liquid- and air-tight fitting of the threads on the nose 690 of the seal insures that the product may be held inside the gun body for an extended time without uptake of moisture. Consequently, the gun may be used intermittently without creating problems of new products setting up within the gun. Needless to say, the form of attachment between the gun of FIGS. 11–15 and the can or hose is subject to variation, using any of the forms of locking devices shown in the other embodiments of the invention. These could include the hose of the type shown at 64 in FIGS. 1, 3 and 6, or fittings of the kind shown in FIGS. 7 and 8.

It will thus be seen that the present invention provides an improved dispensing gun, said apparatus having a number of advantages and characteristics, including those brought out in the specification and drawings and others which are inherent in the invention.

A description of one form of the dispensing gun having been illustrated by way of example, it is anticipated that variations and modifications of the described form of the apparatus will occur to those skilled in the art and it is anticipated that such variations and changes may be made without departing from the spirit of the invention or the scope of the appended claims.

I claim:

1. An improved dispensing gun for fluent products, said dispensing gun comprising, in combination, a gun body portion, a handle, a trigger unit and a dispensing nozzle having an inlet, an outlet and an elongated center passage, said gun body having a product inlet passage, a product outlet passage, and a formation for liquid-tight attachment to a source of said fluent products, said product outlet passage communicating with said nozzle inlet, a reciprocable metering assembly including a valving rod passing through at least a portion of said gun body, a seal assembly having a portion secured to a part of said gun body and a portion secured to and reciprocable with said valving rod, a portion of said reciprocable metering assembly having surfaces dimensioned and shaped for fluidtight contact with annular surfaces forming a valve seat in at least one of said outlet passage and said dispensing nozzle, a resilient, force-applying element urging said metering assembly to a liquid-tight, closed position, said valving rod having a rear end portion, a center portion and a forward end portion, an operative connection between a portion of said metering assembly and said trigger, said seal assembly including a hollow body in the form of a bellows, said bellows being disposed between said portions of said seal secured respectively to said part of said gun body and said valving rod, said bellows being substantially radially incompressible under forces created by aid fluent product but axially expansible and contractible throughout a free but limited range of rod movement when said rod is reciprocated by said trigger.

2. A dispensing gun as defined in claim 1 wherein said valve seat is formed on an inner surface of said dispensing nozzle adjacent said outlet thereof.

3. A dispensing gun as defined in claim 1 wherein said bellows is made from a metal material.

4. A dispensing gun as defined in claim 3 wherein said metal material is stainless steel.

5. A dispensing gun as defined in claim 1 wherein said valve seat is formed adjacent said inlet on said dispensing nozzle.

6. A dispensing gun as defined in claim 1 wherein said reciprocable metering assembly includes a valve head carried by said center portion of said valving rod.

7. A dispensing gun as defined in claim 1 wherein said gun body includes a separately formed metal center body portion, said product inlet passage, said product outlet passage and said formation for liquid-tight attachment in said gun body comprising tapped openings formed in said center body portion.

8. A dispensing gun as defined in claim 1 wherein said force-applying element comprises a coil spring.

9. A dispensing gun as defined in claim 1 wherein said gun body further includes a spring and a combination spring carrier and guide element, wherein said metering assembly includes a rod actuator affixed to one end of said valving rod, said rod actuator having an elongated cylindrical guide body, wherein said trigger includes claws engaging a portion of said actuator and wherein said actuator further includes an enlarged head portion engaged by said spring, said spring being disposed within said carrier and guide, said carrier and guide having a cylindrical opening therein separated from said actuator guide body by only a working clearance.

10. A dispensing gun as defined in claim 9 which further includes a spring compressor axially adjustably positionable in relation to said spring carrier and guide element.

11. A dispensing gun as defined in claim 1 wherein said formation comprises an attachment for a product supply hose.

12. A dispensing gun as defined in claim 1 wherein said formation comprises a fitting for attachment of a pressurized can.

13. A dispensing gun as defined in claim 1 wherein said product inlet passage includes a anti-backflow check valve disposed therein.

14. In a dispensing gun for fluent products having a gun body, a dispensing nozzle, a trigger and a valving rod having a portion engaging a valve seat portion of said nozzle to form a product dispensing valve, the improvement comprising a seal assembly including an elongated hollow center body portion formed into a bellows configuration, from a plurality of dished elements, a nose portion affixed to one end of said bellows in fluid-tight relation, said nose portion having interior threads formed therein, and a mounting flange affixed to the other end of said bellows in liquid-tight relation, said mounting flange being positionable in snug, fluid-tight relation within a portion of said gun body by a locking element, said bellows, said flange and said nose portion all having openings extending therethrough for reception of said valving rod.

* * * * *